(12) United States Patent
Lewis et al.

(10) Patent No.: US 10,736,187 B2
(45) Date of Patent: Aug. 4, 2020

(54) ILLUMINATION DEVICE AND METHOD FOR DECOUPLING POWER DELIVERED TO AN LED LOAD FROM A PHASE-CUT DIMMING ANGLE

(71) Applicant: Lutron Ketra, LLC, Coopersburg, PA (US)

(72) Inventors: Jason E. Lewis, Driftwood, TX (US); Ryan Matthew Bocock, Austin, TX (US)

(73) Assignee: Lutron Ketra, LLC, Coopersburg, PA (US)

( * ) Notice: Subject to any disclaimer, the term of this patent is extended or adjusted under 35 U.S.C. 154(b) by 590 days.

(21) Appl. No.: 15/014,790

(22) Filed: Feb. 3, 2016

(65) Prior Publication Data

US 2017/0223794 A1   Aug. 3, 2017

(51) Int. Cl.
  *H05B 45/10*   (2020.01)
  *H02M 7/217*   (2006.01)
  *H02M 1/08*   (2006.01)

(52) U.S. Cl.
  CPC ............ *H05B 45/10* (2020.01); *H02M 1/081* (2013.01); *H02M 7/2176* (2013.01)

(58) Field of Classification Search
  CPC ............... H02M 7/06; H05B 33/00845; H05B 33/0815; H05B 33/0857; H05B 37/0272
  See application file for complete search history.

(56) References Cited

U.S. PATENT DOCUMENTS

| 8,169,154 B2 | 5/2012 | Thompson et al. |
| 8,723,439 B2 | 5/2014 | Leung et al. |
| 8,803,432 B2 | 8/2014 | Hausman, Jr. |
| 9,220,133 B2 | 12/2015 | Salvestrini et al. |
| 9,247,608 B2 | 1/2016 | Chitta et al. |

(Continued)

FOREIGN PATENT DOCUMENTS

JP   2013-149593   8/2013

OTHER PUBLICATIONS

United States Patent & Trademark Office; Non-Final Office Action, U.S. Appl. No. 15/014,899, dated Oct. 24, 2016.

(Continued)

*Primary Examiner* — Amr A Awad
*Assistant Examiner* — Jonathan G Cooper
(74) *Attorney, Agent, or Firm* — Amy Yanek; Glen Farbanish; Philip Smith

(57) ABSTRACT

An illumination device and method are provided for controlling light emitting diodes (LEDs). The LEDs (specifically, the LED loads) are controlled, e.g., brightness and color of the LED loads, independent of a phase-cut dimmer applied to the AC mains feeding a DC power supply. The power supply is active dependent upon the duration of a conduction angle supplied from the dimmer. The power supply, however, produces drive currents that are independent from the conduction angle by using a two-stage power supply and a relatively slow and fast control loops that are controlled through a microprocessor based control circuit. Parameters stored in the control circuit are drawn by the microprocessor to control the two-stage power supply to produce the drive currents independent and decoupled from the conduction angle yet dependent on the controller parameters.

29 Claims, 9 Drawing Sheets

(56) References Cited

U.S. PATENT DOCUMENTS

| | | | |
|---|---|---|---|
| 9,392,675 B2 | 7/2016 | Taipale et al. | |
| 9,565,731 B2 | 2/2017 | DeJonge | |
| 9,655,180 B2 | 5/2017 | Stevens, Jr. et al. | |
| 9,736,911 B2 | 8/2017 | Taipale et al. | |
| 9,955,547 B2 | 4/2018 | Taipale et al. | |
| 2009/0251059 A1* | 10/2009 | Veltman | H05B 33/0815 315/200 R |
| 2010/0164404 A1* | 7/2010 | Shao | H05B 33/0815 315/297 |
| 2011/0140629 A1 | 6/2011 | Lei et al. | |
| 2011/0291575 A1* | 12/2011 | Shiu | H05B 33/0815 315/192 |
| 2013/0242622 A1 | 9/2013 | Peng et al. | |
| 2013/0307434 A1* | 11/2013 | Zhang | H05B 41/3924 315/219 |
| 2014/0300274 A1 | 10/2014 | Acatrinei | |
| 2014/0300288 A1 | 10/2014 | Chen et al. | |
| 2014/0312782 A1 | 10/2014 | Manor | |
| 2014/0347894 A1 | 11/2014 | Sutardja et al. | |
| 2015/0173144 A1* | 6/2015 | Van Den Broeke | H05B 33/0815 315/291 |
| 2015/0200599 A1* | 7/2015 | Mao | H02M 3/33507 363/21.17 |
| 2015/0264784 A1 | 9/2015 | Romano | |
| 2016/0073469 A1* | 3/2016 | Fukuda | H05B 33/0857 315/294 |

OTHER PUBLICATIONS

United States Patent & Trademark Office; Non-Final Office Action, U.S. Appl. No. 15/014,925, dated Nov. 25, 2016.

* cited by examiner

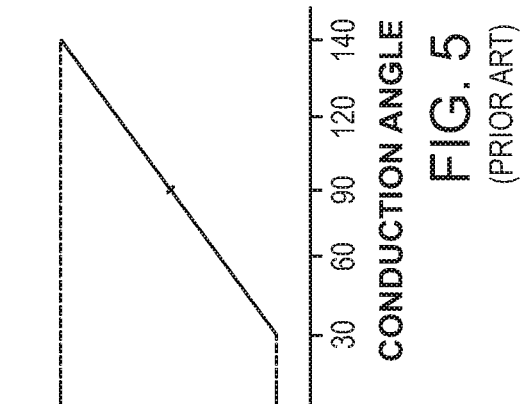
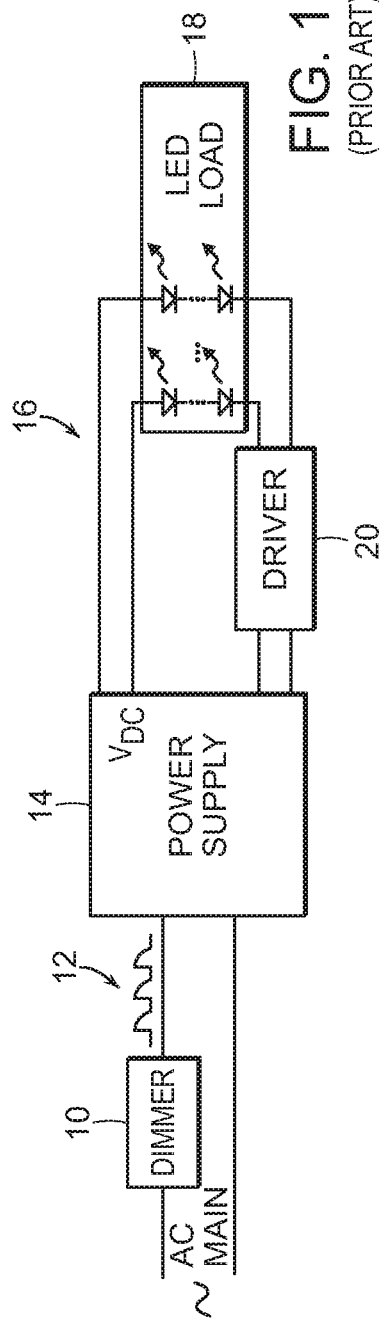
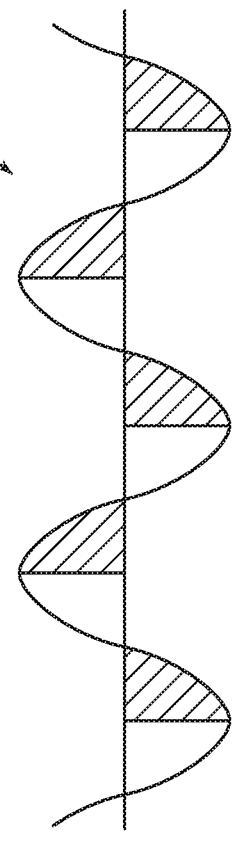
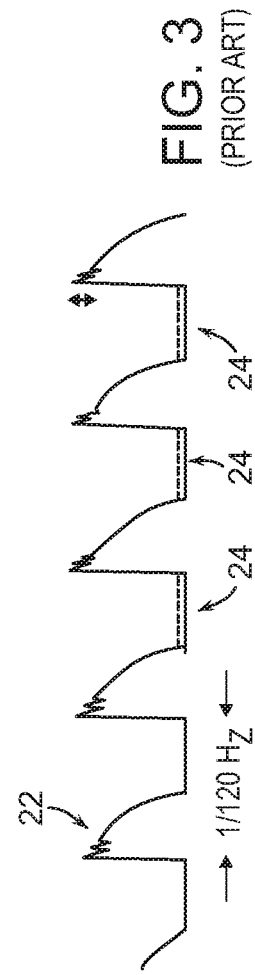

ILLUMINATION DEVICE AND METHOD FOR DECOUPLING POWER DELIVERED TO AN LED LOAD FROM A PHASE-CUT DIMMING ANGLE

CROSS REFERENCE TO RELATED APPLICATION

This application is related to co-pending applications filed concurrently herewith under Ser. No. 15/014,899 entitled "Illumination Device and Method for Independently Controlling Power Delivered to a Load from Dimmers Having Dissimilar Phase-Cut Dimming Angles", and Ser. No. 15/014,925 entitled "Device and Method for Removing Transient and Drill from an AC Main Supplied to a DC-Controlled LED Load."

BACKGROUND OF THE INVENTION

1. Field of the Invention

This invention relates to illumination devices comprising light emitting diodes (LEDs) and, more particularly, to LED illumination devices that use phase-cut dimmers.

2. Description of the Relevant Art

The following descriptions and examples are provided as background only and are intended to reveal information that is believed to be of possible relevance to the present invention. No admission is necessarily intended, or should be construed, that any of the following information constitutes prior art impacting the patentable character of the subject matter claimed herein.

Lamps and displays using LEDs for illumination are becoming increasingly popular in many different markets. LEDs provide a number of advantages over traditional light sources, such as incandescent and fluorescent light bulbs, including low power consumption, long lifetime, no hazardous materials, and additional specific advantages for different applications. Mainstream usage of LED illumination devices has steadily increased over the years with advancements in LED technology and the resulting decreasing costs.

Many lighting applications use light dimmers to adjust the power delivered to the light sources, and therefore, control the intensity of light generated by the light source. Commercially available dimmers come in many different varieties with many different characteristics. Some dimmers comprise micro controllers, which typically are called electronic dimmers, while others comprise only passive components.

The vast majority of dimmers used in residential or commercial applications are phase-control devices (otherwise referred to as phase-cut dimmers), which were initially designed as a simple, efficient, and inexpensive method to dim incandescent light sources. Phase-cut dimmers, both leading-edge and trailing-edge, generally operate by limiting the power delivered to the load by conducting only a certain percentage of the AC waveform each half-cycle. In leading-edge phase-cut dimmers, the forward phase, or leading edge, of the AC waveform is removed from each half-cycle to limit the power delivered to the load. Conversely, trailing-edge phase-cut dimmers limit the power delivered to the load by removing the reverse phase, or the trailing edge, of each half-cycle. In both cases, slight dimming is achieved by removing a relatively small portion of the AC waveform, whereas a larger portion is cut for deeper dimming. Manually varying the dimmer position varies the conduction angle and the conduction period, and hence, the power delivered to the load, resulting in a change in light output. Most phase-cut dimmers are wall-mounted devices powered by an AC mains line voltage of 120V RMS at 60 Hz or 220V RMS at 50 Hz.

FIG. 1 illustrates an example of a typical dimmer-controlled illumination device. Dimmer 10 is coupled to the AC mains line and produces a corresponding conduction angle at its output. An example of a rectified leading-edge conduction angle 12 is shown applied to a conventional power supply 14. If illumination device 16 is used to illuminate an LED load made up of one or more LED chains 18, then the power supply 14 typically includes an AC/DC converter that converts the phase-cut AC waveform at a manually adjustable conduction angle to a DC voltage ($V_{DC}$). From the DC voltage, current of varying magnitude can be applied to the LED load 18 depending upon the brightness needed as well as the color spectrum desired if more than one red, green, blue, or white LED chain is used. Driver 20 can be used to drive the different LED chains to produce the desired brightness in lumens, and the different desired color spectrum.

FIG. 2 illustrates the conduction angle 12 of a leading edge phase-cut dimmer. It is well known that the conduction angle can be a trailing edge as well, and that conduction angle 12 is simply an example of one type of conduction angle formed by a phase-cut dimmer. The cross-hatch portion of the AC main waveform indicates the remaining phase-cut AC mains signal.

When used with an LED load, commercially available phase-cut dimmers provide inconsistent performance when dimming LEDs. One reason is in the design of an LED load versus an incandescent load. For example, an incandescent illumination device presents a simple resistive load with a linear response. Phase-cut dimmers work particularly well with this type of load, since the resistance of the filament decreases as its conduction angle decreases, resulting in naturally smooth dimming.

On the other hand, LED loads do not present a simple resistive load to the dimmer Instead, most LED loads can be characterized by a diode-capacitor power supply feeding a constant current source. The diodes rectify the applied AC voltage allowing it to charge the storage capacitor, while the LED loads draw a constant current from the power supply that is related to the desired dimming level and brightness. In the diode-capacitor power supply model of the LED load, current flows from the applied voltage to the load only when the magnitude of the applied voltage exceeds the stored voltage on the power supply capacitor, often coupled to the output of the power supply. The stored voltage on the power supply capacitor, in turn, depends on the current drawn by the LEDs themselves, which is a function of the LED brightness. Therefore, the current flowing from the power supply to the LED depends both on the instantaneous value of the AC voltage waveform and the brightness of the LED, which is dependent upon the dimmer conduction angle.

In conventional dimmer design, the current flowing to the LED load is related or relative to the conduction angle output from the dimmer. For example, in a single stage switched mode power supply, the energy storage element, either inductor or capacitor, must supply power to the LED while the triac dimmer, for example, is not conducting. As the conduction angle changes, the energy stored in the energy storage element (e.g., the diode-coupled capacitor or current-storage inductor at the output of the power supply), must therefore provide power for changing amounts of time. For example, as the conduction angle decreases, the energy storage element must provide power for increasing amounts of time. To keep the ripple current through the LED load relatively constant, the LED drive current through the LED load must decrease with decreasing conduction angle. The reverse is true if the conduction angle increases.

FIG. 5 illustrates the relationship between the dimmer conduction angle and the brightness of, for example, an incandescent load. Many dimmers have varying ranges of conduction angle that they can produce. Some produce conduction angles between 60° and 120°, while others can produce a wider range of conduction angles. As the dimmer is manually adjusted, either by rotating a knob or moving up and down a slider on a wall plate, the load responds accordingly; typically in linear fashion as shown. In the example of FIG. 5, the angle range from some dimmers may extend from 90° indicating maximum brightness to 45° indicating minimum brightness, while the angle range of other dimmers may extend from 165° downward to 15°; additionally, the angle range of some dimmers can change between the first time such dimmers are turned on and subsequent operation of those dimmers. For instance, some dimmers may first turn on with a minimum angle of 45°, but once on, will produce angles down to 30°.

As noted in conventional dimmer design, power supplied to the load, whether LED or not, is dependent on the conduction angle. If more brightness is needed, the conduction angle must be increased thereby increasing the power drawn from the AC main line and thus the load current supplied to the load. A power supply that produces the drive current to the LED load is therefore dependent on, and coupled to, the conduction angle output from the dimmer. It would be desirable to decouple the power supply from the conduction angle in certain instances where an LED load is used. For example, when different dimmers are used, it may be desirable to detect the differing conduction angle ranges of the newly attached dimmer, and adjust the mapping of the conduction angle to the brightness required by the LED load. In this way, the LEDs can adapt to whatever attached dimmer is used, so that the full mechanical range of a sliding or rotating dimmer can be employed to adjust to any desired LED brightness. Additionally, the LEDs and, more specifically, the LED drive currents applied thereto, can dynamically change the relationship between the input conduction angle and the brightness when attached to dimmers that have a different angle range when first turned on. As such, the LEDs will not "pop on" when such a dimmer is first increased from a minimum conduction angle setting.

Moreover, conventional LED illumination devices deliver power to the LED load proportional to the RMS voltage of the AC main, where the AC main can vary both in angle and amplitude. For example, those AC main voltages can vary by +/−20% or more from a nominal value causing the brightness of the LEDs to vary accordingly. Additionally, the minimum brightness is determined by the RMS voltage at the minimum angle from the dimmer. The minimum RMS voltage can be substantial, which then results in the minimum light output from the LEDs being quite bright, and barely less than a few percentage of the maximum brightness.

Most residential or commercial LED lighting applications come equipped with dimmers, and preferably triac dimmers. However, as noted above, coupling the unique characteristics of drive currents to LEDs and the attempted control of same using a dimmer coupled to the AC main line is problematic. While it is beneficial to retain the dimmer since most residential and commercial applications include a dimmer, it is also beneficial to remove LED output control from being controlled by the dimmer. Thus, decoupling the dimmer conduction angle output from LED output is beneficial not only to enhance the range of LED output from that available using a dimmer but also to accommodate dimmers having differing conduction angles yet maintaining a more precise LED output control then that available using conventional dimmer designs. Most of all, it is of benefit to decouple the conduction angle from the power supply, which conventional dimmer-controlled illumination devices cannot achieve. However, if decoupling were to occur beyond what is currently available in conventional dimmer designs, the power supply would be able to control the minimum light output to be independent of the minimum conduction angle and to be arbitrarily small, for example, 0.1% of the maximum brightness of the LED output. This is much lower than what can be achieved using conventional dimmer-controlled illumination devices. Likewise, conventional dimmers that produce a relatively small maximum angle, for example, 90°, have correspondingly smaller maximum output brightness than those dimmers having a maximum angle greater than 90°. Decoupling the power supplied to the LED load from the conduction angle would enable the maximum brightness to be independent of the maximum conduction angle obtainable by the dimmer. This benefit not being one that a conventional dimmer-controller illumination device can achieve.

Although the RMS line voltage can vary with angle and amplitude, certain transients and drift can also be present from the output of a conventional dimmer-controlled illumination device. As shown in FIG. 3, the output of a leading edge phase-cut dimmer 10 (FIG. 1) can have certain transients 22 that occur when the line voltage is rectified initially to a relatively large voltage value with oscillations occurring on the leading edge of the conduction angle. In addition, at the conclusion of each conduction angle, leakage current through a triac for instance can cause the AC main line voltage into the lamp to drift, which can adversely affect the next conduction angle measurement. As shown, between conduction angles when a triac is supposedly off and the power supply is also off, small leakage currents may still flow through the triac. Leakage current causes upward DC drift 24 between conduction angles and, importantly, at the critical time in which the conduction angle is being measured by the power supply. If the triac resets prior to the AC mains rectified voltage dropping to near zero volts, the power supply might measure an incorrect conduction angle or may prevent the power supply from working properly. The combination of AC transients 22 and DC drift 24 can deleteriously affect measurements taken at power supply 14 coupled to receive the rectified AC main; thus, further affecting the brightness control on the LED load 18. As shown in FIG. 4, changes in conduction angle 26 can cause skew so that the corresponding brightness is not robust throughout the entire conduction angle range. In addition, transients and drift can affect the robustness of the brightness being controlled by the power supply.

In order to deliver smooth brightness control over a much wider range and to adapt to any conduction angle range of any attached dimmer, it would be desirable to introduce an improved power supply architecture. The improved power supply must be one that can decouple power delivered to the LED load from the conduction angle so that the power delivered derives from a source other than the dimmer and, thus, is independent from the conduction angle. The improved power supply can then adapt a power output to the LED load for any dimmer or conduction angle range of a dimmer applied to an AC mains line, and can operate at brightness levels much lower than conventional power supplies so as to dim a lamp to less than 0.1% of the maximum brightness of that lamp, for example. It is further desirable for the improved power supply to remove the AC transients and DC drift so as to achieve a more precise reading of the conduction angle, and also to know more precisely when to activate the power supply, and modify the DC power supply current at each conduction angle duration for more precise control of the drive current across a broader range of LED brightness.

SUMMARY OF THE INVENTION

The problems outlined above are in large part solved by systems and methods for luminance control of illumination devices by decoupling power delivered to an LED load from the phase-cut dimming angle. Those devices and methods also have the ability to independently control power delivered to a load from dimmers having dissimilar phase-cut dimming angles. Any transient and drift from an AC main supplied to a DC-controlled LED load are effectively removed using the improved illumination devices and methods described herein below.

According to a first embodiment, an illumination device is provided having an AC main line configured to receive an AC mains. An LED load is coupled to receive a drive current, and a dimmer is coupled to the AC main line. The power delivered to the LED load is decoupled from the conduction angle in that the LED drive current is not set by the dimmer, or the conduction angle output from the dimmer Instead, the LED drive current is controlled in part by a microcontroller-based control circuit. Control circuit parameters can be set within a memory of the microcontroller, either directly or through radio commands. Those parameters can then be used by, for example, comparators in a DC power supply coupled between the dimmer and the control circuit.

Changes in LED drive current needed to achieve a desired brightness or color mix of the LED output are controlled by the control circuit. Those changes affect a DC voltage ($V_{Dc}$) output from the power supply. The power supply provides $V_{DC}$ to, for example, a diode-coupled output capacitor from which current is drawn as drive currents to the LED load. $V_{DC}$ is regulated by the power supply. For example, more power is drawn from the AC main line when $V_{DC}$ starts to drop and less power is drawn when $V_{DC}$ starts to rise.

The power supply includes a main, or first, control loop (slow loop) and a second control loop (fast loop). The first control loop is a second order loop with an output integrating capacitor on $V_{DC}$ and a loop stabilizing proportional-integral (PI) filter. The output of the loop filter represents the average current drawn from the AC main line measured over more than one cycle of the AC main ($I_{AVE}$). Since the AC mains line voltage is varying and is phase cut by the dimmer, the power supply converts $I_{AVE}$ to the time during each conduction angle in which the DC power supply is active ($T_{PON}$) and the DC power supply current that is drawn from the line during this time ($I_{PS}$). A high bandwidth first order loop within the main control loop (i.e., second control loop) ensures that the actual power supply current ($I_{ACT}$) is roughly equal to $I_{PS}$ during $T_{PON}$. A control circuit can be coupled to receive transitions of the AC main and to measure a conduction angle from the dimmer. The control circuit can produce a maximum duration at which the power supply can be active so that the power supply coupled between the dimmer and control circuit is operational up to and including a maximum duration as measured by the control circuit. The power supply is further configured to receive the LED drive current indirectly through variations in $V_{DC}$ and apply an updated. DC power supply current, independent of the conduction angle yet for a duration no greater than the maximum power supply active duration.

The power supply according to one embodiment is coupled to the output of the dimmer and comprises a first control loop for producing a DC power supply voltage output ($V_{DC}$) and therefore the LED drive current from the DC power supply voltage output, independent of the conduction angle. The power supply state machine is triggered from periodic transitions of the AC main line and is active only while there is sufficient AC mains voltage to deliver power to $V_{DC}$. The output capacitor on DC power supply $V_{DC}$ stores energy that is delivered continuously to the LED load when the power supply is not active. The LED load is coupled to receive the DC power supply maintained on the output capacitor for sufficient duration to produce illumination for the illumination device.

In addition to the first control loop of the power supply configured to produce the DC power supply and DC power supply duration, the power supply also comprises the second control loop having a higher bandwidth than the first control loop. The second control loop is configured to produce a series of pulses, and the duration of the cumulative series of pulses corresponds to the DC power supply duration, and the duration of each of the series of pulses corresponds to the drive current applied to the LED load.

A method is also provided for supplying an AC main to an LED load, comprising adjusting a dimmer coupled to the AC main and rectifying the output of the dimmer. A conduction angle is then measured by measuring the amount of time between when the AC main is initially rectified positive to when the rectified positive AC main phase angle equals 180° or 360° phase angle. Next, a series of pulses (TGATE) are generated during a duration of the conduction angle, each having an active logic value dependent on the amount of drive current supplied to the LED load. The active logic value is independent from the conduction angle and, specifically, the dimmer output.

According to yet another embodiment, the control circuit is contemplated as one configured to measure a range of conduction values whenever the dimmer circuit, produces such a range, extending from when the dimmer is fully off to when the dimmer is fully on. The control circuit measures the range of conduction angles and can produce a maximum duration at which the power supply can be active based on the conduction angles measured. Thus, for example, if a conduction angle output from the dimmer is at 90°, the control circuit measures that conduction angle and sets the maximum time in which the power supply is on, Using that maximum duration of the power supply, the power supply is activated up to and including that maximum duration. The drive current produced from the power supply ranges upward to the maximum duration, but is independent from the range of conduction angles. As an example, if the maximum duration of the power supply is set to a 90° conduction angle, the power supply can be activated for any amount of time $T_{PON}$ up to and including that max time (Max $T_{PON}$). Moreover, the current drawn from the AC mains line ($I_{PS}$) can be adjusted to any value during that time to adjust the DC power supply current averaged over multiple cycles of the AC main ($I_{AVE}$) as drawn from the AC main line and which is proportional to the drive current delivered to the LED load and, consequently, proportional to the brightness.

As another example, if the dimmer is set so that it is fully on, the maximum duration produced from the control circuit may be commensurate with the fully on conduction angle.

However, the current produced by the power supply is independent from that conduction angle, yet scaled downward from a maximum brightness to a minimum brightness. Such brightness levels are not set by the dimmer, but by the controller which controls the DC power supply current as well as the duration at which the power supply is on. Such controller is not operated through changes of the manually controlled dimmer, but through parameters stored in the controller, and specifically within memory of the microprocessor-based controller. The parameters can be stored in firmware or periodically updated through read/write memory via a radio using wireless control, for example. The wireless control can be derived using a wireless communication channel protocol, such as IEEE 802.11 or 802.15. A popular wireless control communication protocol ZigBee, for example.

Accordingly, a method is provided for supplying an AC mains to an LED load by adjusting a dimmer coupled to the AC main between a minimum conduction angle and a maximum conduction angle. Alternatively, the dimmer can simply be set to any conduction angle and utilizing that conduction angle as a maximum conduction angle from which brightness can be controlled. The amount of DC power supply current drawn from the AC mains can then be determined by the power supply loop by monitoring the DC power supply output voltage supplied as drive current to the LED load. Furthermore, the amount of DC power supply current drawn from the AC main can be changed independent from what the dimmer indicates through conduction angle. In this case, the maximum power drawn from the AC mains line is typically determined by the maximum peak currents that the power supply internal components can tolerate.

According to yet another embodiment, the illumination device comprises a damping circuit coupled to the AC main line. The power supply is coupled between the dimmer and the controller to activate the damping circuit. A relatively slow timing circuit is coupled to the power supply and is operated at a clock speed no more than the regular periodic intervals of the AC main. The timing circuit is configured to activate the damping circuit during the duration of the intervals between the conduction angles and also during the initial portion of the duration of the conduction angles to remove transients from the AC main line. Those transients existing primarily at the initial ramp up of the phase-cut dimming angle or conduction angle.

According to yet another embodiment, the power supply is further coupled to activate a bleeding circuit also coupled to the AC main line. The relatively slow timing circuit is further configured to activate the bleeding circuit during the final portion of the conduction angle during the cycles when phase angle is being measured to maintain sufficient triac holding current, which prevents the triac from resetting before the end of the conduction angle. The bleed circuit and the power supply are activated when the triac is ideally not conducting to remove any voltage from the AC main line at the beginning of conduction angle measurements. The bleeding circuit preferably comprises a current source that draws a fixed current from the AC main line so as to maintain the dimmer in an "on" state and to prevent it from latching into an "off" or inactive state, such as what might occur if there is insufficient current through a triac-type dimmer.

BRIEF DESCRIPTION OF THE DRAWINGS

Other objects and advantages of the invention will become apparent upon reading the following detailed description and upon reference to the accompanying drawings.

FIG. 1 is one example of a block diagram of a conventional dimmer-controlled, LED-based illumination device;

FIG. 2 is a timing diagram of the AC main applied to, for example, a trailing edge dimmer;

FIG. 3 is a timing diagram of the conduction angle from the leading edge dimmer having transients at the leading edge of the conduction angle and drift between conduction angles;

FIG. 4 is a timing diagram showing the variability of a 90 degree conduction angle as a result in changes made to, for example, a trailing edge dimmer;

FIG. 5 is a graph of conduction angle vs. brightness that is relatively linear but with variable ranges of conduction angle and brightness;

FIG. 15 is a block diagram of the control circuit and processor within the control circuit for measuring conduction angle and the maximum time in which the power supply is on.

Figure 6:
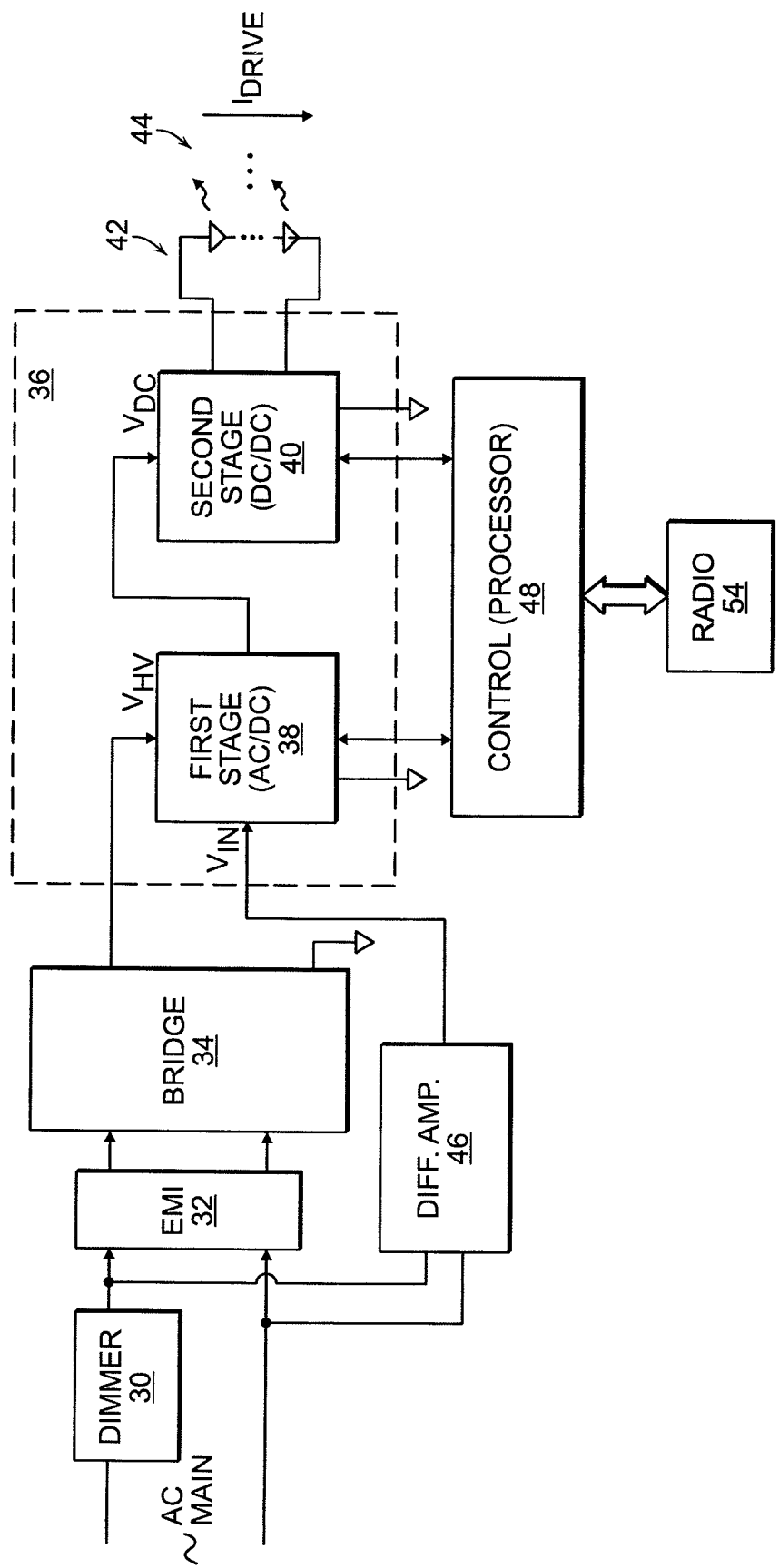
FIG. 6 is a block diagram of a dual stage power supply that controls an LED load decoupled and independent from a conduction angle produced by the dimmer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An illumination device and method are disclosed for luminance control of an LED load. Specifically, the illumination device includes a dimmer coupled to an AC main line and a power supply coupled between the dimmer and the LED load. Coupled to the power supply is a control circuit having a microprocessor. The control circuit measures the conduction angle output from the dimmer onto the input of the power supply. From that conduction angle, the control circuit can determine the maximum time duration at which the power supply can be active. The active power supply produces a drive current onto the LED load independent of the conduction angle, albeit relative to the maximum time it is active. Instead of being dependent on the conduction angle as in conventional power supplies, the improved power supply herein comprises two stages, wherein the first and second stages produce the drive current dependent upon the amount of brightness and color spectrum needed by the LED load, independent of the dimmer angle or conduction angle. The drive current is controlled by the controller and, specifically, by parameters stored and thereafter fetched from a memory of the microprocessor and therefore set within the control circuit. The drive current is not set by the conduction angle output from the dimmer, as would be the case in conventional designs. The controller parameters can be set in firmware during manufacture or can be periodically reset from a wired or wireless communication device coupled to the controller via the wired or wireless communication channel.

FIG. 6 illustrates one example of the improved illumination device. Specifically, FIG. 6 illustrates a dimmer 30 coupled to an AC main line, such as the well-known AC main lines used in residential or commercial applications and carrying, for example, a 120V RMS at 60 Hz or 220V RMS at 50 Hz. Dimmer 30 comprises any dimmer that can couple to an AC mains supply voltage to employ angle modulation of a switching device, such as triac. Such dimmers are relatively well known and are used to adjust the duty cycle of the AC dimmer output signal to provide either a leading edge phase-cut dimmer output or a trailing edge phase-cut dimmer output. Dimmer 30, whether leading or trailing edge, is manually controlled either through sliding or rotating actuators associated with a faceplate mounted in the residential or commercial structure.

Coupled to the output of dimmer 30 can be electromagnetic interference (EMI) circuit 32 to block any disturbance generated by an external source onto the AC main line and can include any of the well-known narrowband or broadband EMI filtering circuitry. Coupled to the output of EMI 32 is bridge circuit 34. Common examples of a bridge circuit include, for example, a diode bridge. Bridge 34 operates in conjunction with dimmer 30 to produce a rectified output ($V_{HV}$) from the phase-cut AC mains. As noted above, however, $V_{HV}$ has transience at the leading edge, for example, of a leading edge rectified dimmer output. Moreover, due to the nature of the triac circuitry of dimmer 30, certain triacs may fail to turn on reliably with reactive loads if the current phase shift within the triac causes the main circuit currents to be below the holding current at the time in which the triac triggers. Thus, a triac can "reset" if the current through the triac drops below the holding current. The problems in conventional design of AC transience on the leading edge of the conduction angle, and shift due to improper triac reset are overcome using the architecture set forth in power supply circuitry 36.

Power supply 36 comprises first stage 38 and second stage 40. First stage 38 is an AC/DC converter that produces a DC voltage ($V_{DC}$) from the AC main voltage ($V_{HV}$). Second stage 40 is a DC/DC converter that produces the drive current $I_{DRIVE}$ to the LED load 42. Thus, while $V_{HV}$ is a filtered and rectified version of the AC mains voltage produced by dimmer 30, $V_{DC}$ is the DC-converted voltage from $V_{HV}$. $V_{DC}$ feeds a relatively large output capacitor to provide the necessary drive current to achieve the desired brightness and color spectrum when multiple LED chains 44 are used. While FIG. 6 illustrates one LED chain, it is understood that power supply 36 can be replicated to produce drive currents to other LED chains having a different color spectrum, such as green, blue, red, or white, to achieve any desired brightness for each LED chain and, thus, the proper color mixing across the plurality of chains.

Figure 15:
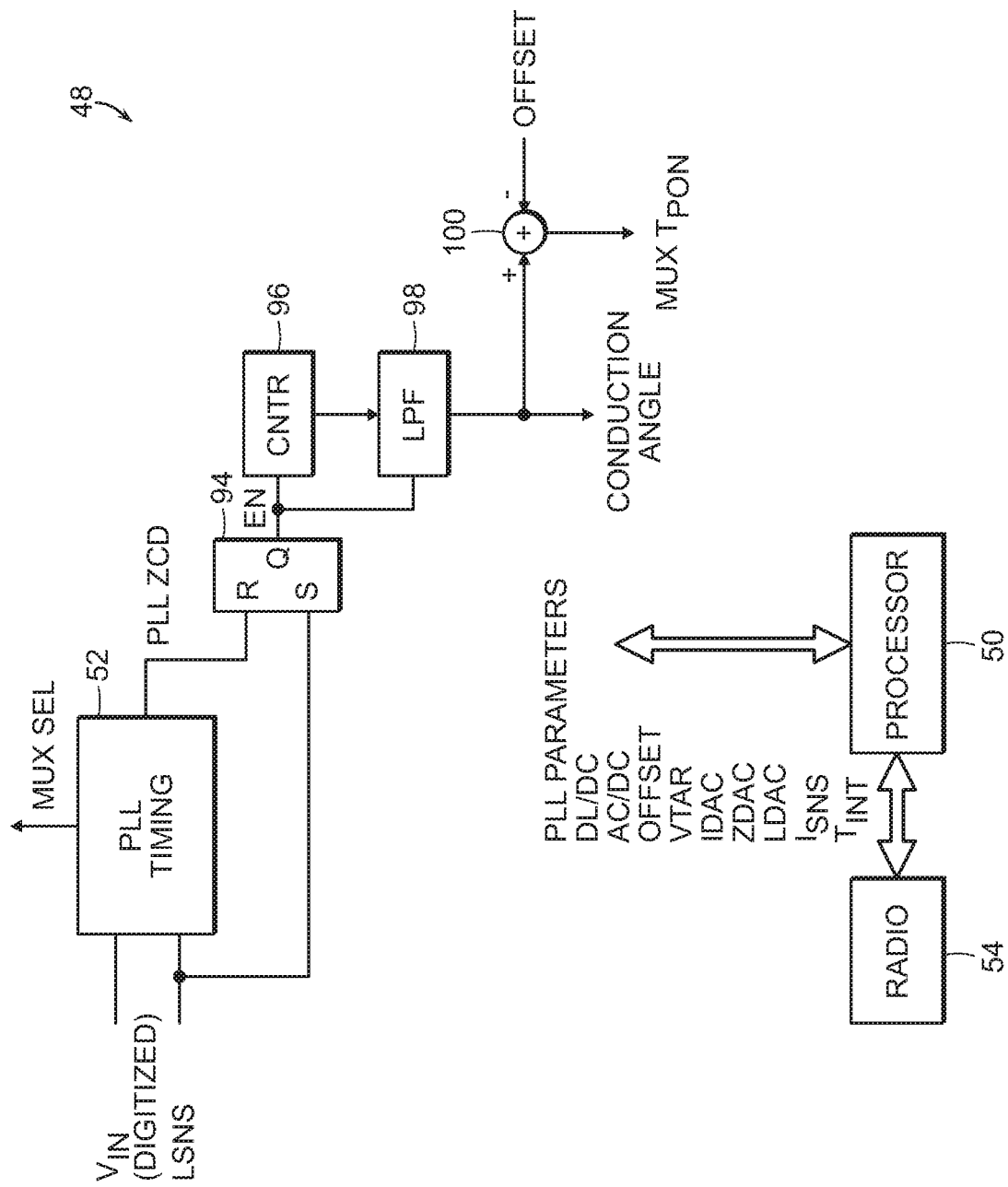

Differential amplifier 46 is coupled to the AC main line and produces a voltage ($V_{IN}$) proportional to the AC line voltage $V_{HV}$ sent to power supply 36. $V_{IN}$ is at a sufficiently low voltage value so that it can be digitized by first stage 38, and thereafter used by the phase-locked loop (PLL) (FIG. 15) of control circuit 48. Referring to FIGS. 6 and 15, control circuit 48 can include a processor 50 along with PLL 52 containing a memory and a microprocessor that sets parameters used by the power supply 36 to change the drive current. The power supply changes the drive current, through the LEDs by use of a first control loop (slow loop) feedback in response to changes in the DC voltage output ($V_{DC}$) from the first stage AC/DC 38. The LED drive current, however, is related and proportional to DC power supply current averaged over multiple cycles of the AC main ($I_{AVE}$) and drawn from the AC mains line, whereby any changes to the LED drive current via the microprocessor-based controller causes average current drawn from the AC main line ($I_{AVE}$) to change. The controller also changes the power supply current drawn from the AC main line during each conduction cycle ($I_{PS}$) as well as the time that the power supply 36 is on ($T_{PON}$). Thus, instead of using dimmer 30 to set the drive current, control circuit 48 sets the drive current based upon the desired brightness needed for each LED chain 44 within LED load 42. Therefore, drive current, is set independent from the conduction angle produced by dimmer 30, using the present dual-stage power supply 36 controlled by control circuit 48. One mechanism in which to set the parameters for controlling the drive current via control circuit 48 is through a wired or wireless user input. An example of a wireless user input includes a wireless communication protocol, such as IEEE 802.15, Bluetooth or ZigBee. Radio 54 is shown to interface with the processor of control circuit 48 in order to set the parameters used to establish any drive current independent of the conduction angle output from dimmer 30.

Figure 7:
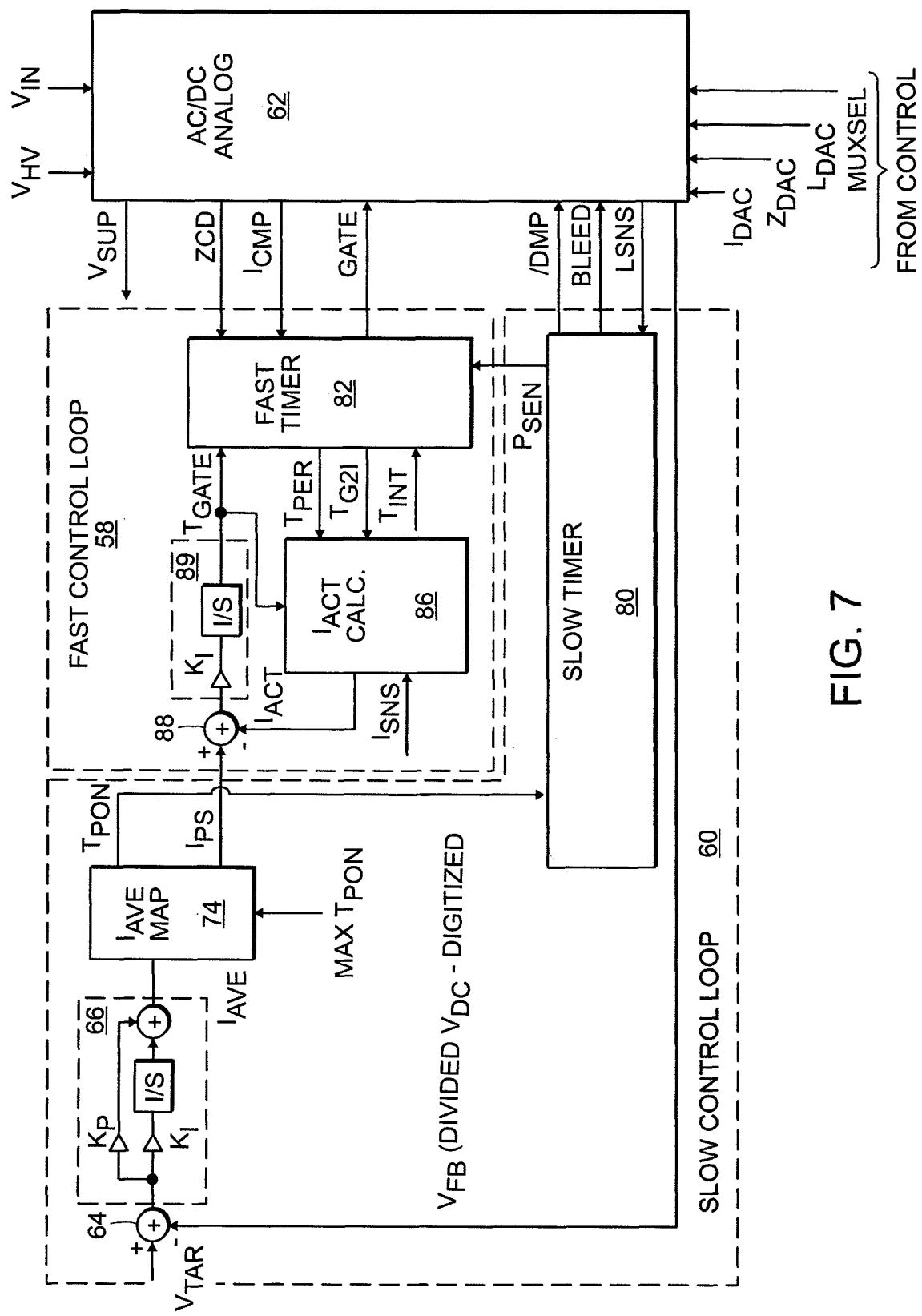
FIG. 7 is a block diagram of the power supply having fast and slow control loops for measuring duration of the conduction angle by the slow control loop and actual instantaneous current drawn from AC main by the fast control loop to set the DC power supply current drawn from the AC main and supplied to the LED load during each conduction cycle.

Turning now to FIG. 7, a block diagram of power supply 36 is shown having a fast control loop 58 and a slow control loop 60. In addition, power supply 36 comprises AC/DC analog portion 62, details of which are set forth in FIG. 11. AC/DC analog 62 receives $V_{HV}$ and $V_{IN}$ from the rectified dimmer and differential amplifier (FIG. 6). Moreover, AC/DC analog 62 receives certain signals from control circuit 48 (FIGS. 6, 15). Further details of how the AC/DC analog 62 derives the zero crossing detect (ZCD) signal and the current comparator ($I_{CMP}$) signal are described with regard to FIG. 11. Signals ZCD and $I_{CMP}$ are used by fast control loop 58, whereas the slow control loop 60 uses a line sense (LSNS) signal derived from $V_{IN}$, details of which are set forth in FIG. 11. LSNS represents the transitions that occur at the leading and trailing edges of the conduction angle duration computed by the determination of $V_{IN}$ at the output of differential amplifier 46 (FIG. 6). In addition to LSNS sent from AC/DC analog 62, a feedback voltage ($V_{FB}$) is sent to slow control loop 60; specifically, to a comparator or adder 64. Comparator 64 compares a divided-down $V_{DC}$ digitized value ($V_{FB}$) to a target value sent from control circuit 48; specifically, from a stored parameter within processor 50 (FIG. 15). The target value ($V_{TAR}$) is a constant set by the control circuit software such that a divided voltage of $V_{DC}$ that is digitized is compared to that constant $V_{TAR}$ provided by processor 50 in control circuit 48. The difference is applied to integrator 66 which filters that difference to produce the DC power supply current averaged over multiple cycles of the AC main ($I_{AVE}$) and drawn from the AC main line. Drive current is that which is applied to the LED load 42. Drive current is proportional to the amount of time that a series of pulses are applied to the analog portion 62 to affect the DC output voltage $V_{DC}$. Slow control loop 60 is a well-known second order loop with a proportional/integral PI loop filter 66, shown to produce the average current ($I_{AVE}$), since the current drawn from the line, $I_{AVE}$, is represented as a number output from the proportional/integral loop filter 66, $I_{AVE}$, when represented as a signal, is proportional to the drive current produced from the power supply 36, which flows into LED load 42. The slow loop preferably has a bandwidth of maybe a few Hz, but DC power supply current ($I_{PS}$) can be calculated at any sample rate above maybe 10 times the slow loop bandwidth. $I_{PS}$ can be updated once per half AC main cycle, or 60 Hz, but update can occur at possibly 10 times per half cycle or once every two half cycles.

Figure 11:
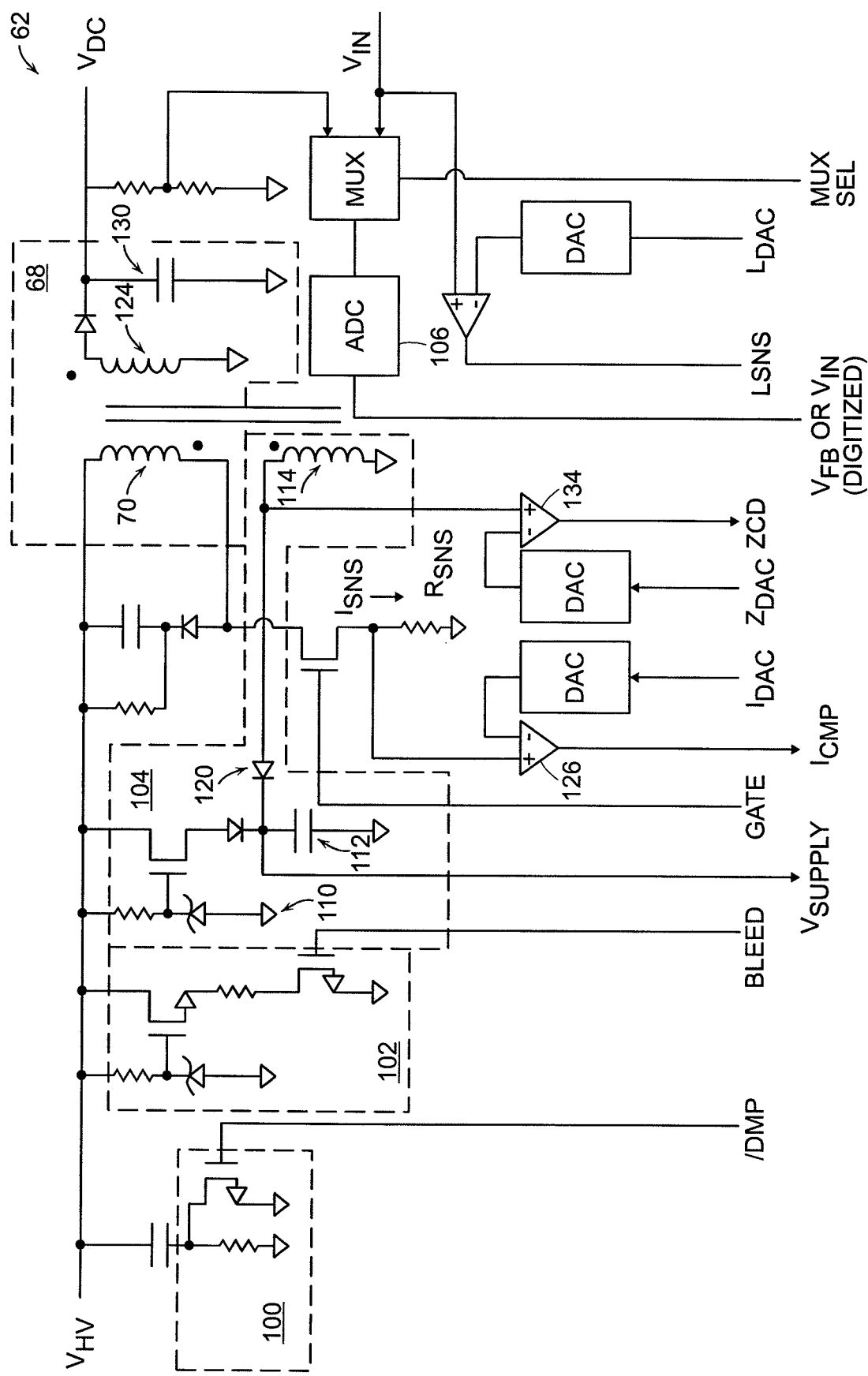
FIG. 11 is a circuit diagram of the AC/DC analog block diagram of FIG. 7.

The $I_{AVE}$ is, in essence, used to generate a series of GATE pulses applied to a flyback converter 68 via an $I_{SNS}$ controlled through the primary winding 70 of flyback circuit 68, all of which are more fully described in FIG. 11. The $I_{AVE}$ signal is used to implement and regulate flyback converter 68 through transitions of the GATE pulses, wherein the GATE pulses are derived through a combination of $T_{PON}$ and $I_{PS}$ at the output of $I_{AVE}$ map circuit 74. Details of circuit 74 as a sequential state machine are more fully described in FIG. 8. Circuit 74 produces $I_{PS}$ and $T_{PON}$ depending on the magnitude of $I_{AVE}$. Details of the mapping function needed to generate $I_{PS}$ and $T_{PON}$ are described in relation to FIG. 8. $T_{PON}$ is used by a slow timer circuit 80 to generate a power supply enable signal (PSEN) having a duration of the $T_{PON}$ duration up to maximum time of the power supply being on (MAX $T_{PON}$), whose value is used by circuit 74.

Figure 8:
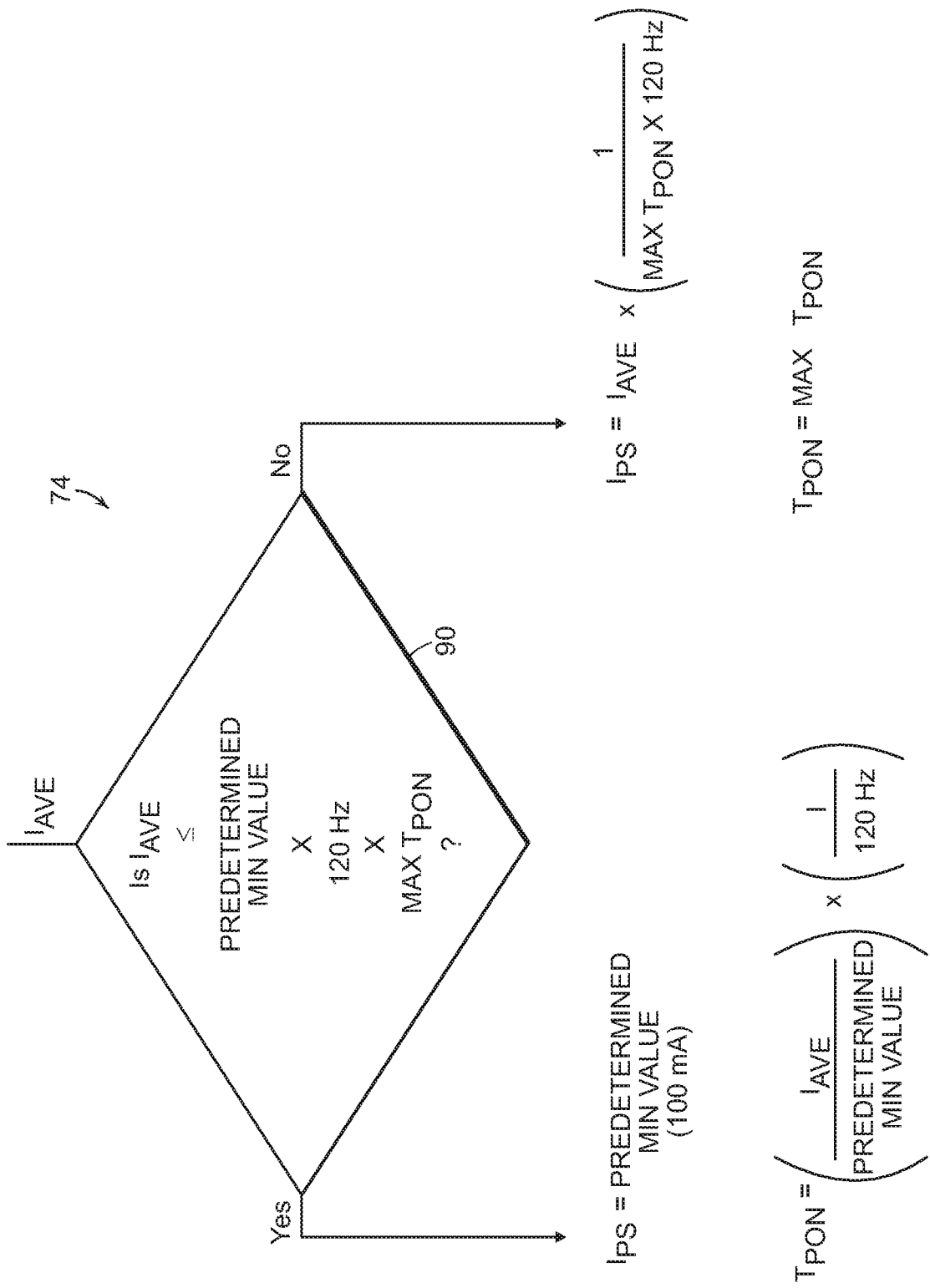
FIG. 8 is a state diagram of the $I_{AVE}$ mapping sequential circuit of FIG. 7.

The value of when the DC power supply is on for a maximum duration (MAX $T_{PON}$), more fully described in FIG. 8, is derived when control circuit 48 detects the LSNS value for determining the conduction angle and subtracting a predetermined offset parameter. The PSEN signal is used to trigger the fast timer circuit; specifically, to produce certain signals, such as $T_{PER}$ and $T_{G21}$ used by $I_{ACT}$ calculation circuit 86 to produce the actual instantaneous current drawn from the AC main and applied to comparator 88 that determines the error between $I_{PS}$ and $I_{ACT}$. That error from comparator 88 is filtered to determine the duration at which each pulse of the GATE signal is in an active logic state, e.g., logic value high shown as $T_{GATE}$. $T_{GATE}$ is used by fast timer circuit 82 to generate the signals necessary by calculation circuit 86 to readjust $I_{ACT}$ so that the actual instantaneous draw resolves back to the DC power supply current ($I_{PS}$) applied at each conduction angle per one half AC mains cycle to the LED load. Further details of the operation of fast control loop 58 are more fully described in the timing diagram of FIG. 12. The drive current applied to the LED load is therefore substantially proportional to the DC power supply current ($I_{PS}$) averaged over multiple cycles of the AC main ($I_{AVE}$), taking into account other current needed to operate all the other circuits DC circuits associated with the illumination device. For example, when the power supply is on for a maximum duration, the drive current is substantially proportional to the DC power supply current. However, when the power supply is on for less than the maximum duration, the drive current is substantially proportional to the DC power supply current minus a predetermined amount of current needed to operate the DC circuits. For example, the LED load can consume, for example, 17 W while the remaining DC circuits can consume, for example, 0.5 W.

Circuit 74 determines both the power supply current ($I_{PS}$) and the length of time ($T_{PON}$) per ½ AC mains cycle in which voltage is applied to the output capacitor coupled to $V_{DC}$ which, in turn, supplies power to the second stage which then applies power (i.e., drive current) to the LED load. PLL 52 and logic within control block 48 (FIG. 15) determine the maximum amount of time that the first stage 38 of power supply 36 is on and can run during each ½ cycle of the AC mains (MAX $T_{PON}$).

Referring to FIGS. 7 and 8, circuit 74 is a sequential machine that compares the incoming $I_{AVE}$ against certain values, as shown by decision block 90. Block 90 determines if $I_{AVE} \le$ a predetermined minimum value (e.g., 100 mA)×120 Hz×MAX $T_{PON}$. If the answer to block 90 is yes, then $I_{PS}$=a predetermined minimum value (e.g., 100 mA)

$T_{PON}$=($I_{AVE}$/a predetermined minimum value)×(1/120 Hz).

If the answer to block 90 is no, then $I_{PS}=I_{AVE} \times (1/\text{MAX} T_{PON} \times 120 \text{ Hz})$ $T_{PON}=\text{MAX } T_{PON}$ The above equations simply note that when determining the magnitude of the power supply current ($I_{PS}$) and the actual time that the power supply operates ($T_{PON}$), a comparison is needed of $I_{AVE}$ against certain parameters. The equations indicate that as $I_{AVE}$ increases, $I_{PS}$ remains at a predetermined minimum value, e.g., 100 mA, and $T_{PON}$ increases. When $I_{PS}$ and $T_{PON}$ increases and once $T_{PON}$=MAX $T_{PON}$, $I_{PS}$ increases from the predetermined minimum value, e.g., 100 mA. Block 90 merely indicates that a minimum power supply current is maintained, and does not increase until after the time that the power supply operates ($T_{PON}$) and is equal to the maximum time in which the power supply can operation (MAX $T_{PON}$). In this fashion, the power supply current is always maintained above a predetermined minimum value and the duration in which the power supply is on will never exceed MAX $T_{PON}$ derived as an offset from the conduction angle as computed by the control circuit. The minimum value is set to be greater than the hold current needed to keep the triac in the conducting state and prevent such from resetting.

Once the power supply current ($I_{PS}$) and the actual time in which the power supply operates ($T_{PON}$) is determined, the actual instantaneous current through first stage 38 ($I_{ACT}$) is controlled by fast control loop 58. Fast control loop 58 has a much higher bandwidth than slow control loop 60. For example, fast control loop 58 may be in excess of 1 kHz, while slow control loop 60 may have a bandwidth of only a few Hz.

Fast control loop 58 is used to compare the actual instantaneous current through the AC/DC converter ($I_{ACT}$) to the power supply current ($I_{PS}$). The power supply current is that which exists through second stage 40 of power supply 36. The difference between the power supply current and the actual instantaneous AC/DC current is compared by comparator 88, and difference is low-pass filtered by filter 89, which is an integrator, to produce the time that the gate is at a logic active state or logic high ($T_{GATE}$). The difference between the instantaneous current ($I_{ACT}$) and the power supply current ($I_{PS}$) is basically the difference between each instantaneous moment in time versus the current over the entire ½ cycle of the AC mains or the current of the AC mains. The actual instantaneous current ($I_{ACT}$) is sampled at the fast timer rate of at least 50 kHz, which is the switching rate of signal GATE. The power supply current ($I_{PS}$) is sampled at a much lower rate, e.g., less than ½ the AC mains cycle. Fast control loop 58 operates to hold the actual instantaneous current ($I_{ACT}$) to the power supply current ($I_{PS}$) over time.

Accordingly, slow control loop 60 controls $V_{DC}$ and fast control loop 58 controls the actual instantaneous current ($I_{ACT}$) drawn from the AC mains. For relatively low average currents ($I_{AVE}$), fast control loop 58 holds $I_{ACT}$ to a predetermined minimum value, e.g., 100 mA, and the amount of time ($T_{PON}$) that the power supply 36 operates; $T_{PON}$ can vary, yet the $I_{AVE}$ is maintained to no less than the predetermined minimum value, e.g., 100 mA. As noted, once $T_{PON}$ reaches MAX $T_{PON}$ determined by control circuit 48, then $I_{PS}$ increases based on any needed increase effectuated by software within the controller or through direct user interaction via radio 54 or a wired link.

As noted in FIG. 7, the $I_{ACT}$ calculation block 86 uses the gate timing ($T_{GATE}$) and the current sense comparator output ($I_{CMP}$) to determine $I_{ACT}$. How that determination takes place is described in more detail with reference to FIGS. 9, 10, and 12. Turning to FIG. 11, AC/DC analog circuit 62 (FIG. 7) is shown in circuit form. AC/DC analog circuit 62 comprises damper circuit 100, bleeder circuit 102, and flyback circuit 68. AC/DC analog circuit 62 also includes control power supply 104 and circuitry needed to produce the line sense (LSNS) from $V_{IN}$ and a feedback voltage ($V_{FB}$ or $V_{IN}$) multiplexed from a shared analog-to-digital converter (ADC) 106, that either inputs a divided-down $V_{DC}$ through resistor dividers or the $V_{IN}$ from differential amplifier 46 (FIG. 6). The $V_{IN}$ voltage output from ADC 106 is at a lower voltage than the AC mains, but is proportional to the AC mains and is purposely used to detect the conduction angle output from the dimmer. $V_{SUPPLY}$ provides voltage needed for the digital circuits, including the control circuit.

Figure 12:
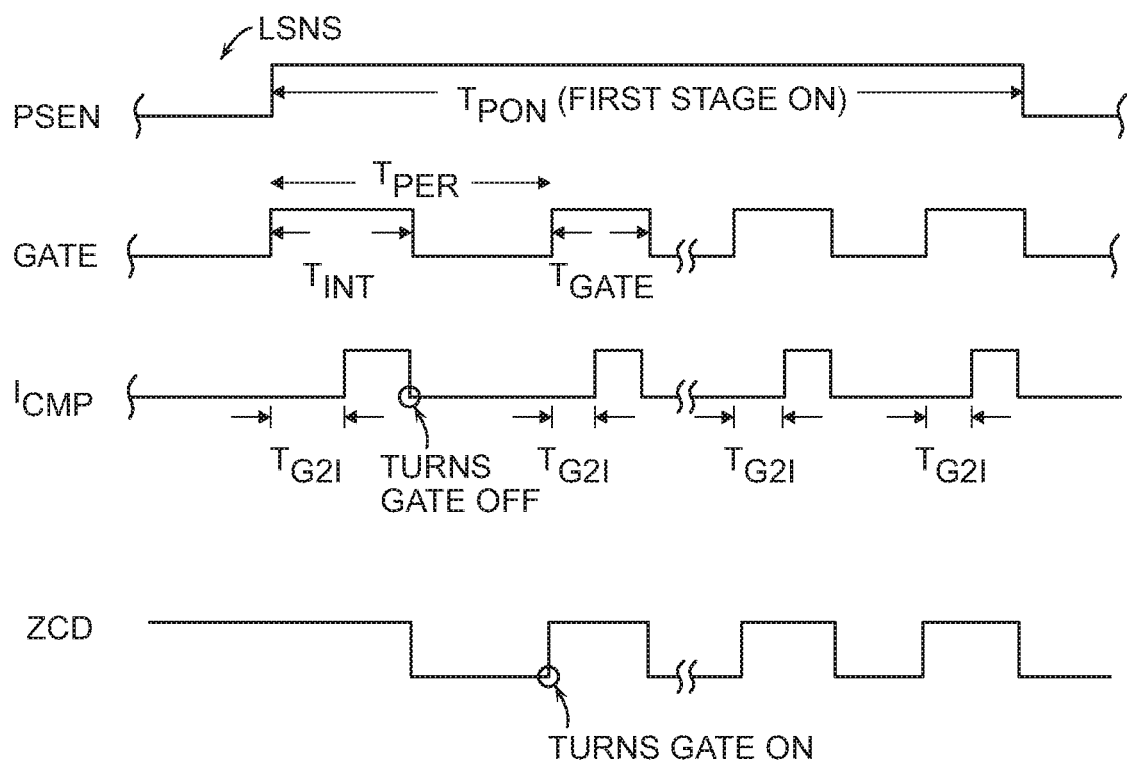
FIG. 12 is a timing diagram showing signals sent to and from the fast timing circuit of FIG. 7.

Damper circuit 100 is simply a transistor placed in parallel with a resistor. The resistor is one having a fairly small value such as, for example, 150 ohms. The resistor damps input transience when the /DMP signal output from slow timer circuit 18 transitions to an active low state. The purpose of damping circuit 100 is to ensure that dimmer circuit 30 operates properly. For example, when a triac is used for the dimmer and the triac transitions on, a large voltage is applied to the power supply. That voltage appears at the leading edge of, for example, the conduction angle (FIGS. 3, 4). That large voltage oscillates as a fairly large transient current. To minimize the oscillation and to prevent the triac from resetting, the AC/DC analog 62 includes damping circuit 100 to place a low impedance resistor onto the capacitive load of the rectified and filtered AC main line to damp the oscillations. Slow timer 80 sets the damp signal (/DMP) active during the transience to connect the passive load of the relative small resistor by turning the parallel-coupled transistor off. The /DMP signal is maintained at an active low between each of a pair of conduction angles, all set by slow timer 80. The active damp extends past the leading edge of the conduction angle to remove or damp the oscillations, and shortly thereafter is deactivated by transitioning on the parallel-coupled transistor so that the power supply begins operating with a large initial $T_{GATE}$ time of $T_{INT}$. The initially large $T_{GATE}$ that consists of $T_{INT}$ is shown in FIG. 12. $T_{INT}$ is predetermined to produce an active input impedance roughly equal to the passive input impedance produced when /DMP is active. A larger $T_{INT}$ versus subsequent $T_{GATE}$ causes the GATE voltage to extend for a longer duration during initial power supply activity so input impedance upon the line voltage $V_{HV}$ ($V_{HV}/I_{ACT}$) is roughly equal to the passive impedance of the resistor within damping circuit 100 when /DMP is active. Referring to FIG. 12, $T_{INT}$ only exists for the first $T_{GATE}$ duration and, thereafter, subsumes back to the normal $T_{GATE}$ duration.

As noted, certain leading edge or trailing edge triac dimmers require current to be drawn through the AC main line throughout each cycle in order for the conduction angle to be measured properly. After firing, a triac will typically turn off once the current through that triac drops below a certain level. For example, the minimum $I_{PS}$, e.g., 100 mA, is sufficient to hold the triac on. However, a triac may reset after power supply 36 turns off, but before the line voltage $V_{HV}$ drops to near 0. If the triac of dimmer 30 resets prior to the line voltage $V_{HV}$ dropping to near 0, controller 48 may measure incorrect dimmer angles, i.e., instead of producing the correct dimmer angle or conduction angle and, thus, the correct MAX $T_{PON}$, the measured conduction angle and resulting MAX $T_{PON}$ may be incorrect. Therefore, slow timer 80 produces a bleed signal (BLEED) to instruct circuit 102 to draw a fixed current of a predetermined minimum value, e.g., 100 mA, during times when the power supply 36 is not active and the conduction angle is being measured. Absent an accurate conduction angle measurement, MAX $T_{PON}$ cannot be output from controller 48, which will dictate when the DC power supply current will be at 100 mA and will exceed, for example, 100 mA when the time the power supply is on reaches the measured MAX $T_{PON}$.

Similar to holding on a triac of dimmer 30, the LED load must draw the drive current $I_{AVE}$ and the power supply current $I_{PS}$ from the trailing edge dimmer when measuring the conduction angle. A trailing edge dimmer turns on when the line voltage is near 0 and can turn off when the line voltage is high or at its peak. The line input capacitance must be discharged rapidly when the trailing edge dimmer turns off in order for controller 48 to determine the conduction angle. During cycles in which controller 48 measures the conduction angle, the BLEED signal goes active after the power supply turns off after $T_{PON}$ ends or when $T_{PON}$=MAX $T_{PON}$ turns off. The falling edge of LSNS indicates the point at which the conduction angle turns off, which puts the power supply in what is known as a current pulse mode (CPM) and turns on the damper circuit with /DMP active low while the dimmer circuit is not conducting. However, the periodic pulses of the GATE signal that occurred during the conduction cycle are maintained in an active logic value, such as logic voltage high during CPM, shown in FIG. 13.

Turning to FIG. 11, control circuit 104 of power supply 62 comprises the start-up circuit 110 coupled to a $V_{SUPPLY}$ bypass capacitor 112 and auxiliary winding 114. When power is first applied to the LED lamp, $V_{HV}$ goes above the zener voltage of the zener diode within circuit 110. $V_{SUPPLY}$ bypass capacitor 112 charges up to the zener voltage minus the transistor gate source voltage, and minus the diode drop of circuit 110. When flyback converter 68 is operating, auxiliary winding 114 continually charges capacitor 112 through diode 120 to a slightly higher voltage than circuit 110 applied to capacitor 112, which then turns off circuit 110. Accordingly, circuit 110 is simply used to charge up to and past the zener voltage via auxiliary winding 114. Once the charge up has occurred, circuit 110 is deactivated and, thereafter, does not burn power from the AC mains through DC power supply 62.

Flyback converter 68 comprises a transformer with primary winding 70 and secondary winding 124. When the GATE signal is high, primary winding 70 conducts and current through increases linearly with time. The current sense resistor $R_{SNS}$ and comparator 126 produces a current comparator output $I_{CMP}$. $I_{CMP}$ indicates when the primary current reaches a certain value set by the IDAC, where IDAC arrives from a parameter set within the control circuit processor. Fast timer 82 (FIG. 7) uses $I_{CMP}$ to determine when to turn GATE off. When GATE goes low, the primary current drops to 0 and the energy stored in the transformer core produces current in secondary winding 124. The secondary winding current flows through the diode and into the $V_{DC}$ bypass capacitor 130 and to the LED load 42 (FIG. 6). A small portion of the energy stored in the core produces current in the auxiliary winding 114 that passes through the diode and into capacitor 112. Once all the energy stored in the core is depleted, the current in both secondary winding 124 and auxiliary winding 114 stops flowing and the voltage across both windings collapses. Zero crossing detect (ZCD) comparator 134 and its corresponding DAC detect this collapse and sets ZCD to a logic high value. Shown in FIG. 12, fast timer 82 uses this rising edge of ZCD to set GATE high, starting another power supply computation cycle.

Figures 13, 14:
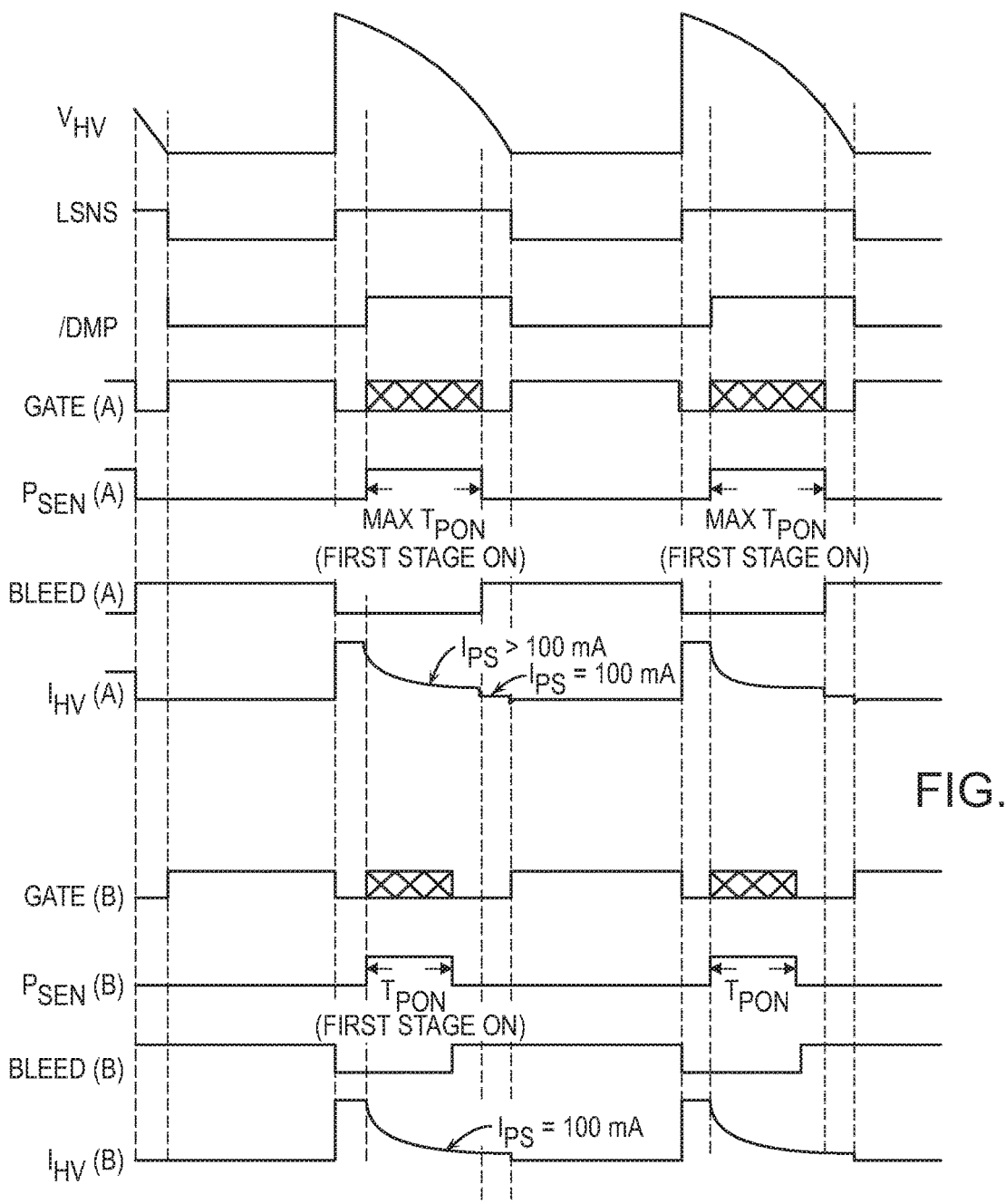
FIG. 13 is a timing diagram showing signals sent to and from the slow timing circuit of FIG. 7 for when the power supply draws greater power from the AC main line and produces a corresponding greater current onto the LED load.
FIG. 14 is a timing diagram showing signals sent to and from the slow timing circuit of FIG. 7 for when the power supply draws smaller power from the AC main line and produces a corresponding smaller current onto the LED load.

Turning now to FIGS. 7 and 12 in combination, FIG. 12 illustrates the timing of the signals in and out of fast timer 82 of FIG. 7. Power supply enable (PSEN) signal, GATE, $I_{CMP}$, and ZCD are logic level signals, while $T_{GATE}$, $T_{PER}$, $T_{G21}$, and $I_{INT}$ are numbers. Slow timer 80 activates the PSEN signal by first detecting LSNS. LSNS is output from the comparator whose input is set by the LDAC parameter of the control circuit and $V_{IN}$. LSNS determines when the rectified AC main is above or below a certain relatively low voltage, e.g., 20 volts. Slow timer 80 and controller 48 use the rising edge of LSNS to initiate the power supply start sequence and the conduction angle measurements, respectively. Referring to FIG. 13, it is from LSNS that PSEN is derived from slower timer 80 in response to LSNS going high and deactivating PSEN after the time specified by $T_{PON}$. As shown in FIG. 12, first stage 38 of power supply 36 is active when PSEN is high, as shown by $T_{PON}$. The AC/DC converter starts switching with a relatively long GATE high time $T_{GATE}$ of $T_{INT}$, which produces an active load roughly equal to the damper passive load. The high bandwidth current control loop or fast control loop 58 then gradually adjusts $T_{GATE}$ and consequently $I_{ACT}$ until $I_{ACT}$ equals the current $I_{PS}$, set by the low bandwidth or slow control loop 60. This reduction $T_{GATE}$ is illustrated in the GATE signal and the sequence of GATE pulses of FIG. 12.

While the time GATE is high is specified by $T_{GATE}$, the time that GATE is low is determined by ZCD. ZCD goes high when all the energy in the transformer core of flyback converter 68 has been transferred and secondary winding 124 and auxiliary winding 114 current drops to 0. As such, a rising edge of ZCD will trigger the start of another AC/DC computation cycle with GATE again going high. Accordingly, the rising edge of ZCD turns GATE on.

When GATE goes high, the current flowing through primary winding 70 increases linearly with time. When the primary winding current reaches a certain value determined by IDAC and $R_{SNS}$, $I_{CMP}$ goes high. The time from GATE going high to $I_{CMP}$ going high is shown as $T_{G21}$ in FIG. 12; the period of GATE is shown as $T_{PER}$. The $I_{ACT}$ calculation block 86 (FIG. 7) uses $T_{G21}$ and $T_{PER}$, along with $T_{GATE}$, to determine the actual instantaneous current $I_{ACT}$ drawn from the AC main line. Accordingly, while the rising edge of ZCD turns GATE on, the expiration of time $T_{GATE}$ from the fast loop integrator that turns GATE off. It is duration $T_{GATE}$ and the series of pulses for $T_{GATE}$ that determine $I_{PS}$ and the drive current that flows into the LED load.

Turning now to FIG. 13, illustrated is a timing diagram of the signals in and out of slow timer 80 (FIG. 7) in relation to $V_{HV}$, GATE, and the PLL ZCD signal from controller 48. In the example shown, dimmer 30 is adjusted to produce roughly 90° of conduction angle. The rectified $V_{HV}$ to first stage 38 of power supply 36 comprises rectified ¼-cycle sine waves. With LDAC sent from the control block configured to switch LSENS when $V_{HV}$ is about 15 volts, LSENS goes high when this leading edge dimmer turns on and then goes low very close to the end of each ¼-cycle. Damper circuit 100 turns on with /DMP going low, with LSENS going low which turns off a fixed delay after LSENS goes high. That fixed delay is necessary to remove the transience from $V_{HV}$. Moreover, the fixed delay is predetermined to be sufficient for all major transience to subside. Shown in FIG. 11, while /DMP is low, the resistor placed in series with the lamp power input capacitance, is coupled to $V_{HV}$.

Referring to FIGS. 13-14, two sets of GATE, PSEN, BLEED, and $I_{HV}$ are shown. The input current is the current drawn from the AC mains; specifically from $V_{HV}$. The (A) group illustrates the timing when the AC/DC stage of the power supply is drawing a relatively large amount of power from the AC mains, wherein the power duration of $T_{PON}$=MAX $T_{PON}$. The (B) group illustrates the timing when the AC/DC stage of the power supply is drawing a relatively little power, where $T_{PON}$<MAX $T_{PON}$ and $I_{PS}$=predetermined minimum value, e.g., 100 mA. In both the (A) and (B) groups illustrated in FIGS. 13-14, the AC/DC converter first stage turns on when the damper circuit turns off with /DMP going high. PSEN goes high and GATE starts switching during $T_{PON}$ (FIG. 14) and during MAX $T_{PON}$ (FIG. 13). For example, PSEN (A) goes low and GATE (A) stops switching after the time specified by MAX $T_{PON}$. The AC/DC converter can efficiently draw power from the AC main line only when $V_{HV}$ is above a certain voltage. MAX $T_{PON}$ is predetermined to ensure that $V_{HV}$ is sufficiently high whenever the AC/DC converter is on.

While LSEN is low, the first stage AC/DC converter operates in the current pulse mode (CPM). CPM provides a DC load for the dimmer and in CPM, the GATE commutes solely on $I_{CMP}$ and ZCD. GATE goes high with ZCD and low with $I_{CMP}$. FIGS. 13-14 illustrate GATE (A) and (B) remaining high when LSEN is low since typically that is the case when $V_{HV}$ is nominally 0. However, CPM enables the LED load to discharge stray capacitances and sink any dimmer leakage currents or other parasitics.

BLEED (A) and (B) are active between PSEN going low and LSEN going high. When BLEED is high, a predetermined fixed current, e.g., 100 mA, is drawn from the AC main line keeping the triac conducting and enables the conduction angle to be accurately measured. BLEED is active when LSEN is low and the dimmer is not conducting for the same reason that the AC/DC converter first stage operates in CPM. The bleeder helps discharge any parasitics. Preferably, the bleeder need not be active between every pair of conduction angles and, possibly, need only be active between every eighth or twentieth pair of conduction angles, since the bleeder does draw significant current and may not be necessary to bleed after every conduction angle. Preferably, the conduction angle need only be measured at every half AC mains cycle, and when the conduction angle is measured, bleeder is active.

The $I_{HV}$ (A) and (B) curves illustrate the current drawn from the AC main line through $V_{HV}$ for the relatively high and low current conditions shown. In both cases, $I_{HV}$ quickly ramps to the same high level when the triac dimmer initially turns on. This current is determined by the damping resistor within the damping circuit, and is generally fairly small, e.g., 150 ohms. When the PSEN goes high, the AC/DC first stage draws roughly this same high current actively. The $I_{HV}$ current then decreases to $I_{PS}$ determined by the low bandwidth or slow control loop 60 over a period of time. In the (A) example, $I_{PS}$ is larger than 100 mA since $T_{PON}$=MAX $T_{PON}$; $I_{HV}$ drops to 100 mA drawn by the bleeder after PSEN goes low and BLEED (A) goes high. In the (B) example, $I_{PS}$ is equal to 100 mA since $T_{PON}$<MAX $T_{PON}$; $I_{HV}$ simply stays at 100 mA since both the bleeder and the AC/DC converter first stage are set to draw 100 mA. Of course, the predetermined minimum value can be set at any value, with 100 mA being one example. As noted, BLEED does not need to be active every cycle, but only during angle measurement cycles, possibly between every eighth, twentieth, or more pairs of conduction angles.

Figures 9, 10:
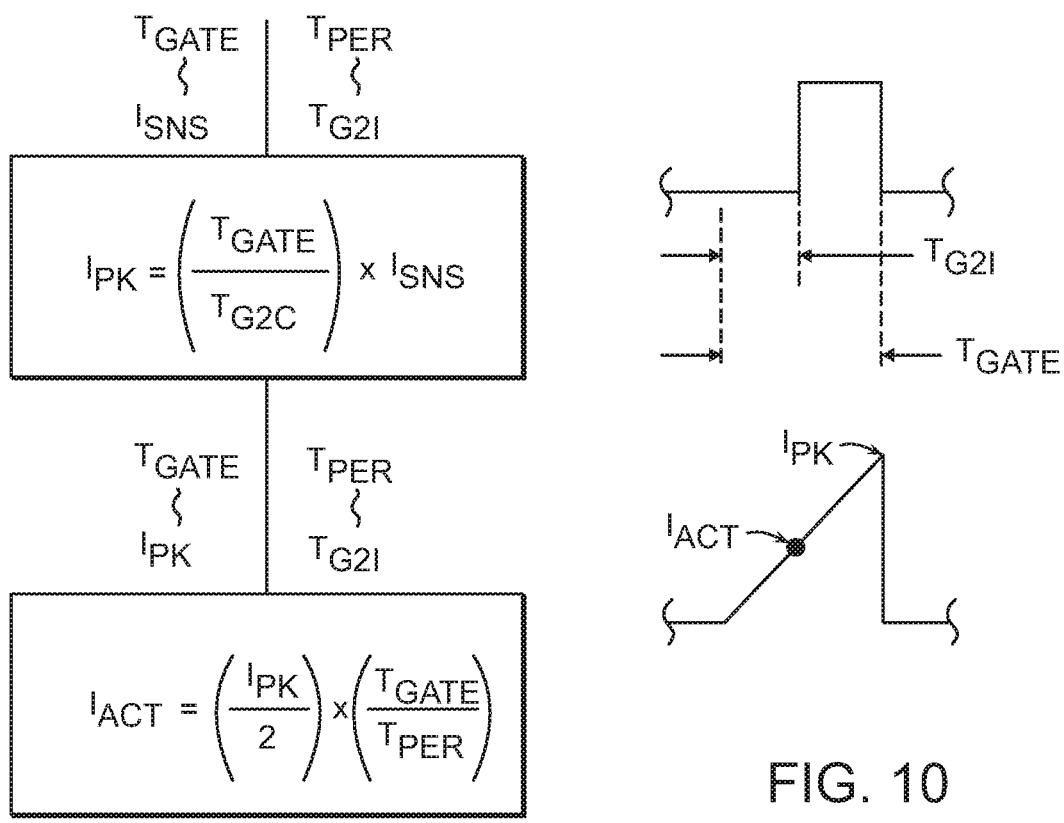
FIG. 9 is a state diagram of the $I_{ACT}$ calculation circuit of FIG. 7.
FIG. 10 is a timing diagram of the $I_{ACT}$ computation point taken from $I_{PK}$ value, and $T_{GATE}$ and $T_{G21}$ timing values.

Turning now to FIGS. 9-10, the $I_{ACT}$ calculation 86 (FIG. 7) logic is shown. Specifically, a state diagram logic block and a timing diagram of $I_{ACT}$ computation point taken from $I_{PK}$ value, as well as $T_{GATE}$ and $T_{G21}$ timing values. First, the $I_{ACT}$ calculation must determine a peak primary current ($I_{PK}$) through the primary winding 70.

$$I_{PK}=(T_{GATE}/T_{G21})\times I_{SNS}$$

$$I_{ACT}=(I_{PK}/2)\times(T_{GATE}/T_{PER})$$

Knowing the peak current through the primary winding, $I_{ACT}$ can be set near a midpoint and derived therefrom based on readings of $T_{GATE}$ and $T_{PER}$. Thus, from the peak primary current, the actual primary current can be derived, with $I_{ACT}$ set to $I_{PS}$ within fast control loop 58 (FIG. 7). $I_{SNS}$ is shown to be the current through $R_{SNS}$ (FIG. 11). The average current through primary winding $I_{ACT}$ over one AC/DC computation cycle is ½ the peak current $I_{PK}$ scaled by the time GATE is high, $T_{GATE}$/one computation cycle $T_{PER}$.

Referring to FIG. 15, control circuit 48 is shown; specifically the AC/DC converter first stage functionality, comprising PLL 52 and microprocessor 50. Microprocessor 50 configures the parameters in the AC/DC first stage and DC/DC second stage converters of power supply 36, and also interfaces to radio 54 to communicate control and status messages. $V_{IN}$ being a scaled version of the line input voltage is digitized and forwarded to PLL 52. PLL 52 qualifies such samples with LSNS and uses successive samples to determine the phase error between the PLL output and the AC main line cycle. The phase error is filtered and then used to produce a digital sine wave in sync with the AC main line voltage. The output of PLL 52 is a number from 1-360 representing the AC mains phase as function of time. The PLL ZCD pulse is high when the phase equals 180° or 360°, indicating a zero crossing detection of the conduction angle phase.

The LSNS and PLL ZCD are forwarded to a set/reset latch 94 whose output enables a counter 96 and low pass filter 98. The count value is used to compute the conduction angle from the dimmer regardless of how that dimmer is set. An offset from processor 50 is compared with the conduction angle via comparator 100 to produce a maximum time in which the power supply is on (MAX $T_{PON}$). MAX $T_{PON}$ and the conduction angle are used by slow control loop 60; specifically, $I_{AVE}$ map 74 (FIG. 7). Although the conduction angle and MAX $T_{PON}$ are computed, it is not the conduction angle or MAX $T_{PON}$ that determines the drive current supplied to the LED load. Thus, the drive current, $I_{PS}$, and $I_{AVE}$ can be independent from the conduction angle output from the dimmer Radio 54 illustrates one way in which to input control and status messages into processor 50. However, processor 50 can generate the parameters shown to set comparator values (within, for example, the analog portion of the power supply) based on software derived commands within processor 50 using various fetch routines from associated memory within processor 50. Processor 50 merely executes those commands to apply the appropriate parameters at the appropriate times onto, for example, the analog portion of the power supply as well as upon the slow and fast control loops.

It will be appreciated that the various parameters and certain magnitudes described herein are given by way of example only. The parameters and magnitudes can be modified to any value for controlling the LED load (both brightness and/or color) independent of the dimmer angle setting, and over a range also independent of a range of the dimmer angle setting. The DC power supply can accommodate and scale to dimmers of differing conduction angle ranges, and those of relatively small maximum conduction angles such as, for example, 90°. By decoupling the LED loads from the dimmer angle, the DC power supply can utilize the full dimming range of 0-100% of the LED brightness by significantly reducing and eliminating the dead travel that may be experienced at the top and bottom of the dimming curve, where conventional dimmer settings produce no visible changes in LED light output. In fact, as long as there is sufficient power to be pulled from the AC mains, the present power supply can adjust the lamp brightness downward to, for example, 0.1% of the maximum lamp brightness. This minimum dimming achieved using the present power supply cannot be attained in conventional dimmer and AC/DC converter architecture. It will be readily appreciated that different parameters and values can be employed provided the above outcomes are achieved without departing from the inventive concepts as will be apparent to those skilled in art in view of this description. It is intended that the following claims be interpreted to embrace all such modifications. The specification and drawings are to be regarded in an illustrative, rather than a restrictive, sense.

What is claimed is:
1. An illumination device for use with a dimmer, the dimmer adapted to be powered by an alternating-current (AC) mains line voltage from an AC mains supply, the illumination device comprising:
    an LED load coupled to conduct a drive current;
    a power supply configured to conduct a power supply current from the AC mains supply and produce the drive current through the LED load; and
    a control circuit coupled to receive a phase-cut AC mains signal from the dimmer, the control circuit configured to cause the power supply to be active for a length of an operating time period during a conduction period of each half-cycle of the phase-cut AC mains signal, the control circuit configured to measure a conduction angle of the phase-cut AC mains signal from the dimmer and determine, in response to the conduction angle, a maximum duration at which the power supply can be active during each half-cycle of the phase-cut AC mains signal;
    wherein the control circuit is configured to set the operating time period of the power supply to the maximum duration when the power supply current is greater than a comparison value, and set the operating time period to be less than the maximum duration when the power supply current is less the comparison value; and wherein an average magnitude of the power supply current over multiple cycles of the AC mains line voltage is proportional to the drive current conducted through the LED load.

2. The illumination device as recited in claim 1, further comprising a radio coupled to the control circuit, wherein the control circuit is configured to set the drive current in response to messages received via the radio.

3. The illumination device as recited in claim 1, wherein the control circuit is configured to set the operating time period of the power supply to the maximum duration when a value representing the average magnitude of the power supply current to be drawn from the AC mains supply over multiple cycles of the AC mains line voltage is greater than the comparison value, and set the operating time period to be less than the maximum duration when the value representing the average magnitude of the power supply current is less the comparison value.

4. The illumination device as recited in claim 3, wherein the control circuit is configured to determine an amount of power supply current to be drawn from the AC mains supply during the conduction period of each half-cycle of the phase-cut AC mains signal in response to the maximum duration and the value representing the average magnitude of the power supply current.

5. The illumination device as recited in claim 4, wherein, when the value representing the average magnitude of the power supply current is greater than the comparison value, the control circuit is configured to set the amount of power supply current to be drawn from the AC mains supply during the conduction period of each half-cycle of the phase-cut AC mains signal as a function of the maximum duration and the value representing the average magnitude of the power supply current.

6. The illumination device as recited in claim 4, wherein, when the value representing the average magnitude of the power supply current is less than the comparison value, the control circuit is configured to set the amount of power supply current to be drawn from the AC mains supply during the conduction period of each half-cycle of the phase-cut AC mains signal to a predetermined minimum power supply current value.

7. The illumination device as recited in claim 6, wherein, when the power supply current is less than the comparison value, the control circuit is configured to set the operating time period as a function of the predetermined minimum power supply current value and the value representing the average magnitude of the power supply current.

8. The illumination device as recited in claim 6, wherein the comparison value is dependent upon the maximum duration and the predetermined minimum power supply current value.

9. The illumination device as recited in claim 4, wherein the comparison value is dependent upon the maximum duration.

10. The illumination device as recited in claim 3, wherein the power supply comprises a first stage configured to produce a direct-current (DC) voltage from the phase-cut AC mains signal, and a second state configured to receive the DC voltage and produce the drive current through the LED load.

11. The illumination device as recited in claim 10, wherein the control circuit is configured to receive a feedback voltage indicating a magnitude of the DC voltage, and to determine the value representing the average magnitude of the power supply current in response to the feedback voltage.

12. The illumination device as recited in claim 1, wherein, when the power supply current is less than the comparison value, the control circuit is configured to set the operating time period as a function of the power supply current.

13. The illumination device as recited in claim 1, wherein the control circuit is configured to set the maximum duration equal to the conduction period of the phase-cut AC mains signal minus a predetermined offset parameter.

14. An illumination device for use with a dimmer, the dimmer adapted to be powered by an alternating-current (AC) mains line voltage from an AC mains supply, the illumination device, the illumination device comprising:
a light emitting diode (LED) load coupled to conduct a drive current;
a power supply configured to produce the drive current through the LED load; and
a control circuit coupled to receive a phase-cut AC mains signal from the dimmer, the control circuit comprising a first control loop for determining an amount of power supply current to be drawn from the AC mains supply during a conduction period of each half-cycle of the phase-cut AC mains signal and a length of an operating time period to occur during the conduction period of each half-cycle of the phase-cut AC mains signal;
wherein the control circuit is configured to:
when in a first state, set the amount of power supply current to be drawn from the AC mains supply to be equal to a predetermined minimum power supply current value and set the operating time period of the power supply to be less than a maximum duration; and
when in a second state, set the amount of power supply current to be drawn from the AC mains supply to be greater than the predetermined minimum power supply current and set the operating time period to be equal to the maximum duration; and
wherein the drive current conducted through the LED load is substantially proportional to an average magnitude of the power supply current over multiple cycles of the AC mains line voltage.

15. The illumination device as recited in claim 14, wherein the control circuit is configured to operate in the first state when a value representing the average magnitude of the power supply current to be drawn from the AC mains supply over multiple cycles of the AC mains line voltage is less than a comparison value, and operate in the second state when the value representing the average magnitude of the power supply current to be drawn from the AC mains supply over multiple cycles of the AC mains line voltage is greater than the comparison value.

16. The illumination device as recited in claim 15, wherein, when operating in the first state, the control circuit is configured to set the operating time period of the power supply as a function of the predetermined minimum value and the value representing the average magnitude of the power supply current.

17. The illumination device as recited in claim 15, wherein the predetermined minimum value is 100 mAmps.

18. The illumination device as recited in claim 15, wherein, when operating in the second state, the control circuit is configured to set the amount of the power supply current to be drawn from the AC mains supply during the conduction period of each half-cycle of the phase-cut AC mains signal as a function of the maximum duration and the value representing the average magnitude of the power supply current to be drawn from the AC mains supply over multiple cycles of the AC mains line voltage.

19. The illumination device as recited in claim 14, wherein the comparison value is dependent upon the maximum duration and the predetermined minimum value.

20. The illumination device as recited in claim 19, wherein the predetermined minimum value is 100 mAmps.

21. The illumination device as recited in claim 14, wherein the control circuit further comprises a second control loop clocked at a faster speed than the first control loop.

22. The illumination device as recited in claim 21, wherein the second control loop is configured to control an actual power supply current drawn by the power supply from the AC mains supply towards the amount of power supply current determined by the first control loop during the operating time period of each half-cycle of the phase-cut AC mains signal.

23. The illumination device as recited in claim 21, wherein the second control loop is configured to generate a series of pulses configured to be applied to a converter circuit for control of current conducted through a primary winding of a transformer of the converter circuit, a secondary winding of the transformer configured to produce a DC voltage that is used to generate the drive current.

24. The illumination device as recited in claim 23, wherein the control circuit is configured to produce digital reference parameters converted to analog and used by comparators in the power supply to adjust the duty cycle of each of the series of pulses.

25. The illumination device as recited in claim 14, wherein the control circuit is configured to measure a conduction angle of the phase-cut AC mains signal, and determine, in response to the conduction angle, the maximum duration at which the power supply can be active during each half-cycle of the phase-cut AC mains signal.

26. A method for supplying an AC main to a light emitting diode (LED) load, comprising:
receiving a phase-cut AC mains signal from a dimmer coupled to an AC mains supply;
conducting, by a power supply, a power supply current from the AC mains supply;
measuring a conduction angle of the phase-cut AC mains signal;
determining, in response to the conduction angle, a maximum duration at which the power supply can be active during each half-cycle of the phase-cut AC mains signal;
controlling the power supply to be active for a length of an operating time period during a conduction period of each half-cycle of the phase-cut AC mains signal;
when in a first state, setting an amount of power supply current to be drawn from the AC mains supply by the power supply during the conduction period to be equal to a predetermined minimum power supply current value and setting the operating time period of the power supply to be less than the maximum duration; and
when in a second state, setting the amount of power supply current to be drawn from the AC mains supply by the power supply during the conduction period to be greater than the predetermined minimum power supply current and setting the operating time period to be equal to the maximum duration.

27. The method as recited in claim 26, further comprising:
determining a value representing an average magnitude of the power supply current to be drawn from the AC mains supply over multiple cycles of an AC mains line voltage of the AC mains supply;
operating in the first state when the value representing the average magnitude of the power supply current to be drawn from the AC mains supply is less than a comparison value; and
operating in the second state when the value representing the average magnitude of the power supply current to be drawn from the AC mains supply is greater than the comparison value.

28. The method as recited in claim 26, further comprising:
when in the first state, setting the operating time period of the power supply as a function of the predetermined minimum value and the value representing the average magnitude of the power supply current to be drawn from the AC mains supply over multiple cycles of the AC mains line voltage.

29. The method as recited in claim 26, further comprising:
when in the second state, setting the amount of power supply current to be drawn from the AC mains supply during the conduction period of each half-cycle of the phase-cut AC mains signal as a function of the maximum duration and the value representing the average magnitude of the power supply current to be drawn from the AC mains supply over multiple cycles of the AC mains line voltage.

* * * * *